United States Patent [19]

Haldopoulos

[11] 3,951,798
[45] Apr. 20, 1976

[54] CONTAINER FILTER COMBINATION

[75] Inventor: Ioakim Haldopoulos, College Park, Ga.

[73] Assignee: Glasrock Products, Inc., Atlanta, Ga.

[22] Filed: Feb. 25, 1974

[21] Appl. No.: 445,472

[52] U.S. Cl.............................. 210/452; 210/469; 210/DIG. 23
[51] Int. Cl.² .......................................... B01D 27/00
[58] Field of Search............... 23/253; 128/2, 214 R, 128/224; 210/282, 448, 464, 469, DIG. 23, 452; 222/189; 210/463, 474, 475, 477

[56] References Cited
UNITED STATES PATENTS

| 929,337 | 7/1909 | Stebbins............................ 222/189 |
| 1,672,466 | 6/1928 | Oshman et al.................. 210/474 X |
| 2,761,833 | 9/1956 | Ward ................................. 210/282 X |
| 2,869,724 | 1/1959 | McDevitt........................... 210/282 X |
| 3,189,223 | 6/1965 | MacKal............................. 222/189 X |
| 3,248,017 | 4/1966 | Allen .................................. 222/189 |
| 3,322,114 | 5/1967 | Portnoy et al. .............. 128/214 R X |
| 3,361,304 | 1/1968 | Thompson ...................... 222/189 X |
| 3,449,081 | 6/1969 | Hughes .......................... 210/282 X |
| 3,715,035 | 2/1973 | Teeple, Jr. et al.............. 210/282 X |

FOREIGN PATENTS OR APPLICATIONS 688,781  8/1930  France.............................. 210/510

Primary Examiner—Charles N. Hart
Assistant Examiner—Richard W. Burks
Attorney, Agent, or Firm—Lane, Aitken, Dunner & Ziems

[57] ABSTRACT

The disclosed apparatus is a dispensing device which includes a filter member, a cap member having seating means within same for temporarily retaining the filter member within the cap, and a container having a neck portion defining a mouth or opening, the neck portion being adapted to receive the cap member and to retain the filter member within its mouth upon removal of the cap.

9 Claims, 4 Drawing Figures

CONTAINER FILTER COMBINATION

BACKGROUND OF THE INVENTION

The present invention relates to a dispensing device provided with a filter member and, more particularly, to a device for separating fibrin and particulate material from blood serum and for dispensing small amounts of the filtered serum.

U.S. Pat. No. 3,322,114, issued to Portnoy et al. May 30, 1967, discloses an apparatus for securing a sample of blood plasma which includes a hypodermic needle for drawing a blood sample directly from a human or animal and a small container for receiving the sample. The apparatus of Portnoy et al. also serves as a dispenser and may include a filter member to separate the serum from the fibrin and other particulate matter. While admirably suited for its intended purpose, the apparatus of Portnoy et al. is less suited for use in applications where it is desirable to run a number of tests from a given blood sample. For obvious reasons it is undesirable to inject a needle into a blood donor merely for the purpose of collecting a separate test sample. To use the apparatus of Portnoy et al. as a filter and dispenser for a previously collected blood sample, it would be necessary to remove the dispensing nozzle and filter member assembly from the mouth of the container, place a blood sample within the container, and then replace the dispensing nozzle and filter assembly. The handling of the dispensing nozzle which would be necessitated by such a procedure would endanger the cleanliness and sterility of the nozzle and filter assembly.

U.S. Pat. No. 3,449,081, issued to Hughes June 10, 1969, discloses a container/dispenser for deparating particulate matter from blood serum by filtration and for dispensing the serum in dropwise fashion. The filter member of the assembly disclosed by Hughes is carried in the cap and is adfixed to the container after the blood sample is placed therein. However, the blood filtrate or serum is dispensed directly through the cap which must first be removed and then replaced after the container has received the blood sample. No provision is made for protecting the cap dispenser from contamination during handling.

SUMMARY OF THE INVENTION

It has now been discovered that the problems associated with the prior art serum separating and dispensing devices are effectively overcome by providing a dispensing device with a cap member having seating means within same for temporarily retaining a filter member within the cap. Accordingly, the present invention provides a dispensing device which includes a filter member, a cap member, seating means within same for temporarily retaining the filter member within the cap, and a container having a neck portion defining a mouth or opening. The neck portion is adapted to receive the cap member and to retain the filter member within its mouth upon removal of the cap. The device of present invention is particularly suited for the separation of serum from fibrin and other particulate matter.

The seating means within the cap member provides a press fit for a first end portion of the filter member and the neck or mouth of the container provides a press fit for a second end portion of the filter member. The press fit between the seating means within the cap and the first end portion of the filter member is not as tight as that formed between the mouth of the container and the second end portion of the filter member. The design of the cap and filter member assembly is such that the second end portion of the filter member is forced within the mouth or opening of the container by the act of securing the cap to the container neck.

Accordingly, it is an object of the present invention to provide an improved device for filtering and dispensing a liquid.

It is a further object of this invention to provide such a device which may be filled with a liquid sample and then used to filter and dispense same without the necessity of handling the dispensing nozzle or filter member.

It is another objective of this invention to provide such a device for dispensing a liquid drop by drop.

Other objects and further scope of applicability of the present invention will become apparent to those skilled in the art from a reading of the detailed description to follow, taken in conjunction the accompanying drawing.

DESCRIPTION OF THE PREFERRED EMBODIMENTS

Figure 1:
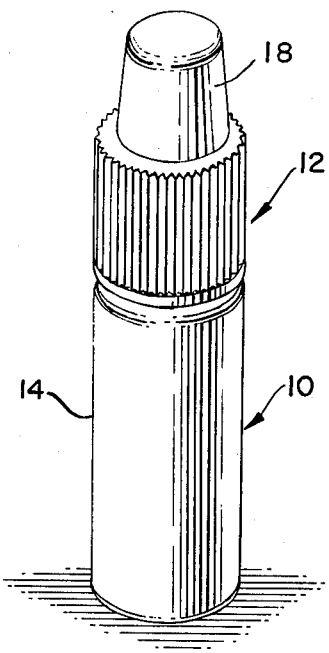
FIG. 1 is a persepctive view of one embodiment of the present invention with the cap in place on the container body.

With reference to the drawings, FIG. 1 shows a container 10 with an attached cap 12 which represents one embodiment of the present invention. The cylindrical vertical wall portion 14 of the container 10 may be made of any material but is preferably constructed of a resilient material so that the container 10 may be squeezed by hand in order to dispense a liquid contained therein.

Figure 2:
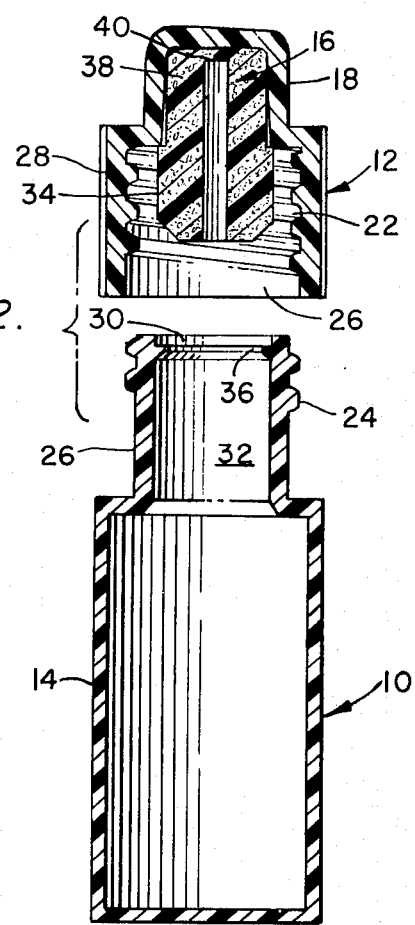
FIG. 2 is a vertical cross-sectional view of one embodiment of the present invention as it appears before seating the cap on the neck of the container.

FIG. 2 is in cross-section to show the filter member 16 and the press fit engagement between the filter 16 and seating means 18 within the cap 12. The inner cylindrical surface 20 of cap 12 is provided with a plurality of screw threads 22 designed to mate with male threads 24 provided on neck portion 26 of the container 10. The outer cylindrical surface 28 of cap 12 has a plurality of serrations to facilitate grasping the cap by hand to screw same onto the neck of the container.

After the fluid to be filtered and dispensed is placed within the container, the cap and filter assembly is screwed over the mouth of the container. In doing so, the filter is forced into the mouth 30 of the container where it remains when the cap is removed. The press fit between the inside circumferential surface 32 of the neck 26 and the circumferential surface 34 of the filter member 16 is a frictional engagement. The retaining force between the filter member 16 and the neck 26 of the container may be increased by providing raised portions or surface irregularities on the inner surface 32 of the neck 26, e.g. the raised circumferential rib 36 shown in FIG. 2.

Optionally, the cross-sectional area of filter end 34 may differ from that of the opposite end 38, the only requirement being that their respective diameters may be of such sizes relative to the seating portion 18 of the cap and the mouth or opening 30 of the container that the press fit between end portion 34 34 and the neck surface 32 is tighter than the fit between end portion 38 of the filter and seating means 18. The cross-sectional configuration of end portions 34 and 38 of the filter member and the matching configurations of the container mouth 30 and the seating means 18 may be of any design, e.g. circular, rectangular, etc., again the only requirement being a tighter press fit within the container mouth relative to the press fit of the filter within the container cap.

Figure 3:
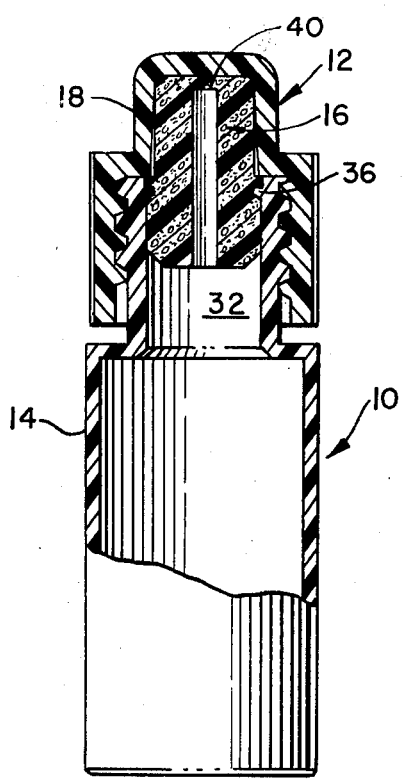
FIG. 3 is a vertical cross-sectional view of the embodiment of FIG. 2 as it appears after the cap is fully seated on the neck of the container.
Figure 4:
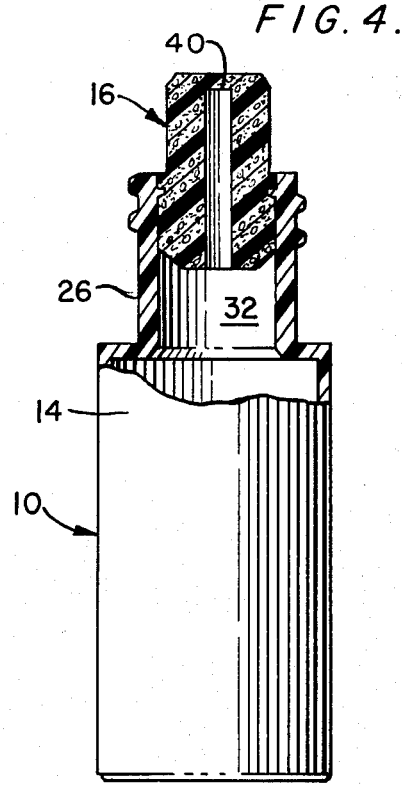
FIG. 4 is a vertical cross-sectional view of the embodiment shown in FIG. 2 and FIG. 3, as it appears after the cap has been removed from the container.

In order to provide the press fit seating of the filter within the cap and within the mouth of the container, either the filter, the cap and container, or all three elements should be constructed of a resilient material, e.g. rubber or plastic. In the embodiments shown in FIGS. 2, 3 and 4, the filter member 16 is in the form of a cylindrical plug having end portion 34 and 38 of different diameters and a central longitudinal bore 40. The longitudinal bore 40 serves to direct the flow of fluid to the tip of the end portion 38 to form a drop thereon, thus facilitating the dispensing of small samples. Absent such a longitudinal bore, the filtered liquid would tend to permeate throughout end portion 38 and cover its entire outer surface.

The filter member 16 may be constructed of any porous material. The nature of the material and porosity thereof should be chosen in keeping with the nature of the fluid for which the dispenser is designed. For purposes of separating fibrin and particulate matter from blood serum, the filter member 16 may conveniently be fabricated of a porous material made from polyethylene granules. Other porous thermoplastic materials are also suitable.

In a preferred embodiment the length of the screw threads of the cap and the length of the filter member are of such proportions that the screw threads of the cap engage the screw threads of the container before the filter member comes in contact with the neck of the container. This relationship assures that the force required for inserting the filter member into the container neck is provided by turning the cap instead of initially pushing the cap and then turning it.

After screwing the cap and filter assembly fully onto the neck of the container, the cap is removed leaving the filter member 16 within the mouth 30 of container 10. To filter and dispense the fluid contained therein, the container is merely turned upside down and its walls squeezed by hand to force the fluid therein through the filter and out of the container.

Although the embodiment shown in the drawings provides a threaded connection between the container 10 and the cap 12, any means for securing the cap to the container would be equally suitable.

It will be readily appreciated from the foregoing description that the filter member 16 also serves as a dispensing nozzle. It will be further appreciated that the container may be filled with the sample to be filtered and the filter mounted within the mouth of the container without risking contact between the dispensing surface and the hands of the user. Thus, the cleanliness and sterility of the filter member 16 are maintained.

While the above description is directed to a specific embodiment of the apparatus, it is understood that the various modifications within the spirit of the invention may occur to those skilled in the art. Therefore, it is intended that no limitations be placed on the invention except as defined by the scope of the appended claims.

I claim:

1. A dispensing device comprising:
   a filter member;
   a cap member having seating means within said cap member for temporarily retaining said filter member within said cap;
   a container having a neck portion defining a mouth or opening, said neck portion being adapted to receive said cap member; and
   means, responsive to placing said cap on said container, for transferring said filter member from said cap to said neck portion and retaining said filter within said neck portion upon removal of said cap.

2. The dispensing device of claim 1 wherein said seating means provides a press fit for a first end portion of said filter member and wherein said means for transferring and retaining said filter member is a press fit provided for a second end portion of said filter member by said neck member which is tighter than that provided by said seating means.

3. The dispensing device of claim 2 wherein the first end portion of said filter has a different cross-sectional area than the second end portion of said filter.

4. The dispensing device of claim 1 wherein said neck portion is provided with a first threaded portion and wherein said cap is provided with a second threaded portion which compliments said first threaded portion and which provides a seal therebetween.

5. The device of claim 1 wherein said neck portion has a cylindrical configuration and is provided with at least one irregularity or protrusion on its inner wall surface for retaining said filter member.

6. The device of claim 1 wherein said filter member is a cylindrical plug having a longitudinal bore opening at one end of said plug and closed at the opposite end of said plug.

7. The device of claim 6 wherein said filter member is a resilient porous thermoplastic material.

8. The dispensing device of claim 1 wherein said container has flexible walls so that a liquid contained therein may be dispersed by squeezing together said flexible walls.

9. A device for separating fibrin and particulate matter from a blood sample and for dispensing the serum, said device comprising:
   a porous filter member;
   a cap member and seating means within said cap member for temporarily retaining said filter member within said cap;
   a container having a neck portion defining a mouth or opening for said container;
   means associated with said neck portion for receiving said cap member and forming a seal therewith; and
   means associated with said neck portion for transferring said filter member from said cap member and retaining said filter member within said mouth upon removal of said cap member.

* * * * *